Jan. 13, 1925.
P. J. BELLAVANCE
SEPARABLE BUTTON
Filed May 17, 1924
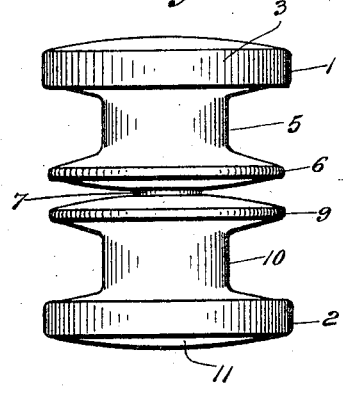
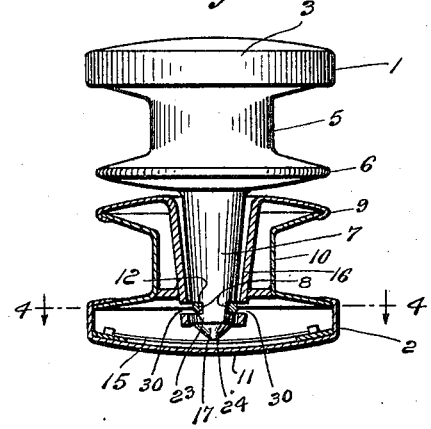
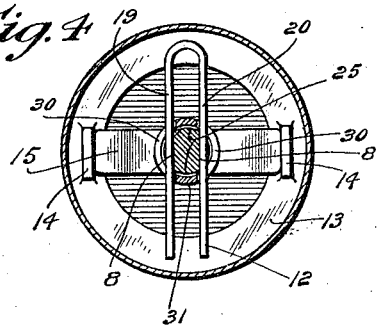
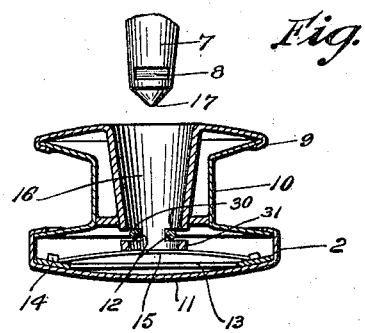
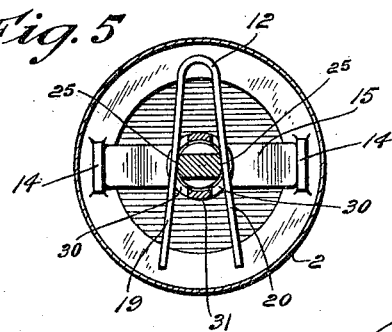
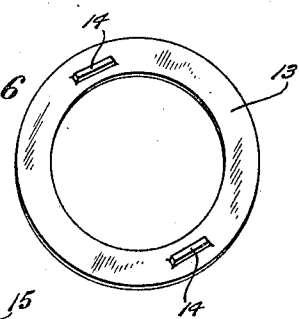
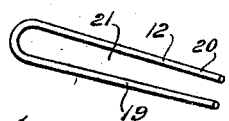
INVENTOR.
Paul J. Bellavance
BY Thomas A. Jenckes Jr.
ATTORNEY.

Patented Jan. 13, 1925.

1,522,854

UNITED STATES PATENT OFFICE.

PAUL J. BELLAVANCE, OF ATTLEBORO, MASSACHUSETTS.

SEPARABLE BUTTON.

Application filed May 17, 1924. Serial No. 714,071.

*To all whom it may concern:*

Be it known that I, PAUL J. BELLAVANCE, a citizen of the United States, residing at 118 Wilmarth Street, Attleboro, in the county of Bristol and State of Massachusetts, have invented certain new and useful Improvements in Separable Buttons, of which the following is a specification.

My invention relates to separable cuff buttons. I am aware that clothes buttons, glove buttons, etc., have been attached by having horizontally disposed slits cut in the stem of the button member adapted to be retained in position by a spring retained in position in the socket therefor normally held by the cloth, etc., or vice versa. I am also aware that separable cuff-buttons comprising a pair of co-acting male and female members each comprising a head, a base, and a shank, the male member having a stem projecting centrally from the base thereof adapted to be retained in position in a socket located centrally of the female member have been constructed. So far as I am aware no one has to date in a satisfactory manner provided a separable cuff-button in which the stem of the male member is retained in the socket of the female member in the manner aforedescribed. It is thus an object of my invention to provide a separable cuff-button wherein the male and female members are retained together in this desirable fashion.

To effect a more stable connection and union between the coacting members, I continue the socket of the female member into the head thereof, locate the locking spring in the head of the female member and elongate the stem of the male member to project within the head of the female member to be retained in position by said locking spring. This connection as it permits the elongated stem to fit snugly into a socket of a substantially corresponding size provides increased bearing surfaces, gives greater strength and lessens the tendency to wobble or become loosened, thereby eliminating the strain on the locking device which tends to cause undesired separation of the button members.

For a locking device I preferably employ a simple U-shaped or hair-pin spring secured within the head of the female member. As the sides of the spring are normally substantially parallel, to secure the members together it is merely necessary to push the stem of the male member within the socket of the female member, and the outer end of the stem of the male member will project between the sides of the U-shaped spring causing them to expand. As explained, the stem of the male member near the outer end thereof is provided with oppositely disposed parallel horizontal slits. After insertion the resilient spring will then tend to return to its original U-shaped position and the substantially parallel sides thereof bearing against the substantially parallel slits will cause the stem and integral male member to revolve until the substantially parallel sides of the spring are snugly retained within the substantially parallel horizontal slits of the stem of the male member. To disengage it is merely necessary to give the male member a quarter turn, and the periphery of the stem between the slits will cause the parallel sides of the spring to expand permitting facile removal of the stem. It is thus a further object of my invention to provide by means of the U-shaped locking spring I employ a more facile locking and unlocking of the co-acting members, and a firmer retention of the members together when locked.

In addition I am the first to provide, so far as I am aware, a separable cuff button retention spring. This spring serves a double purpose. It is located transversely of the socket in the female member so that the outer end of the stem of the male member may bend it down when said stem is inserted therein. This retention spring, after the substantially parallel sides of the locking spring have registered in the slits in the stem of the male member, tending to press the stem of the male member out of the socket binds the sides of the slits against the substantially parallel sides of the locking spring so as to firmly retain the co-acting members together. A further function of this retention spring is to expel the stem of the male member, thus separating the button members without further effort on the part of the wearer when said male member is given a quarter turn. It is obvious that this retention spring may be used with any type of stem and socket separable cuff-buttons and so far as I am aware is new in devices of this description. It is thus a further object of my invention to provide improved retention means between the male and female co-acting members and a further object to provide improved expulsion or separation means for said cuff-buttons.

The essential objects of my invention therefore are the provision of security against accidental detachment of the co-acting members one from the other: adaptability for facile manipulation in locking and unlocking and security in locking action: and as my device may in its entirety may be readily stamped out of sheet material, simplicity and inexpensiveness of construction.

These and such other objects and features of my invention that may hereinafter appear will be best understood from a description of one embodiment thereof, such as is illustrated in the accompanying drawings.

In the drawings Fig. 1 is a side elevation of a separable cuff-button embodying my invention showing the parts locked or fully engaged.

Fig. 2 is a side elevation, partially shown in vertical central section of a cuff-button embodying my invention showing the parts in locked position.

Fig. 3 is a vertical central sectional view of the female member of the button, showing the outer end of the stem of the male member about to be inserted therein.

Fig. 4 is a sectional view taken along the line 4—4 of Fig. 2.

Fig. 5 is a sectional view similar to Fig. 4, showing the locking spring expanded to permit withdrawal of the stem of the male member.

Fig. 6 is a perspective view of the spring securing ring contained within the head of the female member.

Fig. 7 is a perspective view of the retention and expulsion spring.

Fig. 8 is a perspective view of the locking spring.

In the drawings, wherein like characters of reference indicate like parts throughout, 1 and 2 illustrate the co-acting members. The male member 1 comprises a head 3, the outer surface of which may be suitably ornamented, a shank 5 and a base 6. Located centrally of the base 6 is the preferably integral stem 7 projecting vertically therefrom. Near the outer end 17 of the stem, the stem 7 is provided with the oppositely disposed substantially parallel horizontal slits 8 for a purpose to be described. The female member 2 also comprises a base 9, a shank 10, and a head 11, the surface of which may also be suitably ornamented. The female member 2 is provided with a socket 16 located centrally thereof substantially corresponding in size to the stem 7, and in the embodiment shown extending from the base 9 thereof centrally to the head 11 thereof. The stem 7 of the male member is preferably elongated to project within the head 11 of the female member. The head 11 of the female member forms a hollow casing adapted to contain the locking, retention, and expulsion devices. The male and female members may be readily stamped as usual of suitable material.

As explained, I provide expansible spring means to cooperate with said horizontal slits 8 to firmly retain the stem 7 of the male member within the socket 16 of the female member 2. In the preferred embodiment shown, said expansible spring means preferably comprises a U-shaped spring 12 having the substantially parallel sides 19 and 20 firmly secured against rotation by means of the channels 30 cut in the extension 31 of the socket 16 within said head 11 of the female member 2. Said spring 12 is so placed as to permit the outer end 17 of the stem to be inserted in the space 21 between the substantially parallel sides 19 and 20 thereof.

As explained I provide in addition a retention and expulsion spring. I provide a spring securing ring 13 adapted to be firmly retained inside the head 11. In the embodiment shown said ring 13 is of a size to form a tight fit, resiliently binding against the sides of the head 11. I provide the lugs 14 raised up from said ring 13. The retention spring 15 in the embodiment shown comprises a flat segmental shaped spring. This spring is mounted transversely of the head 11 and of the opening of the socket 16 therein. When attached said spring 15 is bent and retained in position between the lugs 14. As the spring 15 is preferably curved or bowed during its manufacture as shown in Fig. 7, it is obvious that it will tend to resume its original bow-shaped position even after passing the dead centre horizontal line between the lugs 14. In use the button-holes of the cuff normally surround the shanks 5 and 10 of the button members. The bases 6 and 9 are made as thin as possible so as to leave as little material as possible between the cuffs. By locating all the retaining members in the head 11 normally in position outside of the cuff, I permit the bases 6 and 9 respectively to be made correspondingly thinner than where the retaining devices are located within the bases of said separable co-acting members.

To engage the members, the stem 7 is inserted in the socket 16 and the co-acting members 1 and 2 pushed together. The outer end 17 of the stem causes the substantially parallel sides 19 and 20 of the locking spring 12 to expand and separate, permitting its insertion therebetween. As soon as the substantially parallel sides of the locking spring 12 come in contact with the cooperating substantially parallel slits 8 in the stem 7 of the male member 1, it is obvious that the sides 19 and 20 of the spring 12 will cause the stem 7 and integral member 1 to revolve until the substantially parallel sides 19 and 20 of the locking spring 12 compactly register within the substantially parallel horizontal slits 8 of the stem 7. This substantially parallel registration firmly retains the male and female members together. Where the retention spring 15 is employed, it is obvious that substantially simultaneously with the separation of the substantially parallel sides 19 and 20 of the locking spring 12, the outer end 17 of the stem 7 will depress the retention spring 15 from the position shown in Fig. 3 to the position shown in Fig. 2. When the substantially parallel sides 19 and 20 of the locking spring 12 are registered in the substantially parallel slits 8 of the stem 7, it is obvious that the retention spring 15 tending to resume its normal position as shown in Fig. 3, will tend to push the stem 7 outwards causing the sides 19 and 20 of the locking spring 12 to tightly bear against the shoulders 23 and 24 formed between said slits 8 and the outer end of the stem thus firmly securing the members 1 and 2 in locked position. To disengage the members, one is held immovably and the other is turned or twisted a quarter turn in either direction. It is obvious that the portions 25 of the stem 7 intermediate the slits 8 on turning of the stem 7 will cause the substantially parallel sides 19 and 20 of the locking spring 12 to expand (Fig. 5) and as the portions 25 are of a diameter equal to that of the rest of the stem it is obvious that the stem 7 may be readily withdrawn from the now expanded sides 19 and 20 of the locking spring 12. When the retention spring 15 is employed, and the stem 7 turned so that the portions 25 thereof expand the sides 19 and 20 of the locking spring 12 as just explained, the retention spring 15 will then tend to resume its normal position as shown in Fig. 3 and function to eject the stem 7 and the integral male member 1 without other manual effort.

It is obvious that I have provided a separable cuff-button of improved construction having improved locking and semi-automatic retention and expulsion features.

It is understood that my invention is not limited to the specific embodiment shown and that various deviations may be made therefrom without departing from the spirit and scope of the appended claims.

What I claim as new and desire to secure by Letters Patent is:

1. A separable button comprising a pair of male and female co-acting members, each having a head, a shank and a base, the female member having a socket extending centrally therein from the base to the head, the male member having an elongated stem projecting centrally from the base thereof having substantially parallel horizontal slits therein on diametrically opposite sides near the outer end thereof and an expansible spring member contained within the head of the female member adapted to register in said slits in the elongated stem of the male member to bind said members together.

2. A separable button comprising a pair of male and female co-acting members, each having a head, a shank, and a base, the female member having a socket extending centrally therein from the base to the head, the male member having an elongated stem projecting centrally from the base thereof having substantially parallel horizontal slits therein on diametrically opposite sides near the outer end thereof and expansible spring means contained within the head of the female member adapted to expand to receive the outer end of the stem therein on insertion thereof, to contract to register in said slits in the elongated stem of the male member to bind said members together and adapted on a quarter turn of said stem member to expand to permit withdrawal of said stem member therefrom.

3. A separable button comprising a pair of male and female co-acting members, each having a head, a shank and a base, the female member having a socket extending centrally therein from the base to the head, the male member having an elongated stem projecting centrally from the base thereof having substantially parallel horizontal slits therein on diametrically opposite sides near the outer end thereof and a U-shaped spring contained within the head of the female member having substantially parallel sides adapted to register in said substantially parallel slits in the elongated stem of the male member to bind said members together.

4. A separable button comprising a pair of male and female co-acting members, each having a head, a shank, and a base, the female member having a socket extending centrally therein from the base to the head, the male member having an elongated stem projecting centrally from the base thereof having substantially parallel horizontal slits therein on diametrically opposite sides near the outer end thereof and a U-shaped spring contained within the head of the female member having substantially parallel sides adapted to expand to receive the outer end of the stem therebetween, on insertion thereof to contract and on contact with said slits to revolve said stem to permit said substantially parallel sides of said U-shaped spring to register in the substantially parallel slits of said stem to bind said members together and on a quarter turn of said stem member to expand on contact with the periphery of said stem between said slits to permit withdrawal of said stem therefrom.

5. A separable button comprising a pair of male and female co-acting members, each having a head, a shank and a base, the female member having a socket extending centrally therein from the base to the head, the male member having an elongated stem projecting centrally from the base thereof having substantially parallel horizontal slits therein on diametrically opposite sides near the outer end thereof, expansible spring means contained within the head of the female member adapted to register in said slits in the elongated stem of the male member to bind said members together and a retention spring contained within the head of the female member transversely of said socket adapted to bear against the outer end of said stem to cause the sides of said slits to bear against said expansible spring means to secure said members together and to eject said stem on partial turning thereof.

6. A separable button comprising a pair of male and female co-acting members, each having a head, a shank and a base, the female member having a socket extending centrally therein from the base to the head, the male member having an elongated stem projecting centrally from the base thereof having substantially parallel horizontal slits therein on diametrically opposite sides near the outer end thereof, expansible spring means contained within the head of the female member adapted to expand to receive the outer end of the stem therein, on insertion thereof to contract to register in said slits in the elongated stem of the male member to bind said members together and adapted on a quarter turn of said stem member to expand to permit withdrawal of said stem member therefrom and a retention spring contained within the head of the female member transversely of said socket adapted to bear against the outer end of said stem to cause the sides of said slits to bear against said expansible spring means to secure said members together and to eject said stem on partial turning thereof.

7. A separable button comprising a pair of male and female co-acting members, each having a head, a shank, and a base, the female member having a socket extending centrally therein from the base to the head, the male member having an elongated stem projecting centrally from the base thereof having substantially parallel horizontal slits therein on diametrically opposite sides near the outer end thereof, a U-shaped spring contained within the head of the female member having substantially parallel sides adapted to register in said substantially parallel slits in the elongated stem of the male member to bind said members together and a retention spring contained within the head of the female member transversely of said socket adapted to bear against the outer end of said stem to press the substantially parallel sides of said U-shaped spring against the sides of the slits in said stem to retain said members together and to eject said stem on partial turning thereof.

8. A separable button comprising a pair of male and female co-acting members, each having a head, a shank and a base, the female member having a socket extending centrally therein from the base to the head, the male member having an elongated stem projecting centrally from the base thereof having substantially parallel horizontal slits therein on diametrically opposite sides near the outer end thereof and a U-shaped spring contained within the head of the female member having substantially parallel sides adapted to expand to receive the outer end of the stem therebetween, to contract on insertion thereof and on contact with said slits to revolve said stem to permit said substantially parallel sides of said U-shaped spring to register in said substantially parallel slits of said stem to bind said members together and on a quarter turn of said stem to expand on contact with the periphery of said stem between said slits to permit withdrawal of said stem therefrom and a retention spring contained within the head of the female member transversely of said socket adapted to bear against the outer end of said stem to press the substantially parallel sides of said U-shaped spring against the sides of the slits in said stem to retain said members together and to eject said stem on partial turning thereof.

9. A separable button comprising a pair of male and female co-acting members each having a head, a shank, and a base, the female member having a socket located centrally therein, the male member having a stem projecting centrally from the base thereof having substantially parallel horizontal slits on diametrically opposite sides thereof and expansible spring means contained within the female member adapted to register in said slits in the elongated stem of the male member to bind said members together, and a retention spring contained within the female member transversely of said socket adapted to bear against the outer end of the stem to cause the sides of said slits to bear against said expansible spring means to secure said members together and to eject said stem on partial turning thereof.

10. A separable button comprising a pair of male and female co-acting members each having a head, a shank, and a base, the female member having a socket located centrally therein, the male member having a stem projecting centrally from the base thereof, having substantially horizontal slits therein on diametrically opposite sides thereof, a U-shaped spring contained within the female member having substantially parallel sides adapted to register in said substantially parallel slits in the stem of the male member to bind said members together and a retention spring contained within the female member transversely of said socket adapted to bear against the outer end of the stem of the male member to press the substantially parallel sides of the U-shaped spring against the sides of said substantially parallel slits in the stem to retain said members together and to eject said stem on partial turning thereof.

In testimony whereof I affix my signature.

PAUL J. BELLAVANCE.